United States Patent
Unger

(10) Patent No.: US 6,879,641 B2
(45) Date of Patent: Apr. 12, 2005

(54) TRANSMIT PRE-EQUALIZATION IN A MODEM ENVIRONMENT

(75) Inventor: J. David Unger, Windham, NH (US)

(73) Assignee: BigBand Networks BAS, Inc., Westborough, MA (US)

( * ) Notice: Subject to any disclaimer, the term of this patent is extended or adjusted under 35 U.S.C. 154(b) by 0 days.

(21) Appl. No.: 10/170,770

(22) Filed: Jun. 13, 2002

(65) Prior Publication Data

US 2003/0231716 A1 Dec. 18, 2003

(51) Int. Cl.[7] .......................... H04K 1/02; H04L 25/03; H04L 25/49
(52) U.S. Cl. ....................... 375/296; 375/298
(58) Field of Search ................................. 375/297, 296, 375/346; 330/51, 2; 341/144; 332/124, 159

(56) References Cited

U.S. PATENT DOCUMENTS

| | | | |
|---|---|---|---|
| 5,113,414 A | | 5/1992 | Karam et al. |
| 5,268,848 A | * | 12/1993 | Coker et al. ................. 708/322 |
| 6,141,390 A | * | 10/2000 | Cova ........................... 375/297 |
| 6,342,810 B1 | * | 1/2002 | Wright et al. ................. 330/51 |
| 6,373,902 B1 | * | 4/2002 | Park et al. ................... 375/296 |
| 2003/0018982 A1 | * | 1/2003 | Zeidler et al. .............. 725/151 |

* cited by examiner

Primary Examiner—Stephen Chin
Assistant Examiner—Curtis Odom
(74) Attorney, Agent, or Firm—Blakely Sokoloff Taylor & Zafman LLP

(57) ABSTRACT

The signal distortion present in a transmitted signal is measured and used to generate filter coefficients. The coefficients are stored in memory. A modulator generates an intermediate frequency signal. The modulator inputs the signal to a programmable predistortion filter. The characteristics of the filter are altered by the filter coefficients that have been programmed into the filter. The resulting filtered signal is upconverted to a frequency in a transmit frequency band.

22 Claims, 3 Drawing Sheets

TRANSMIT PRE-EQUALIZATION IN A MODEM ENVIRONMENT

TECHNICAL FIELD

The present invention relates generally to modems and particularly to data communication with a cable modem.

BACKGROUND

It is generally not practical in a communications system to generate and work with frequencies that are the same as the transmit frequency. Depending on the type of system, the transmit frequencies may be greater than 100 MHz.

The generated signals, therefore, are mixed from an intermediate frequency to a higher, transmit frequency by an upconverter circuit. The upconverter may introduce noise and frequency response distortion to the signal prior to transmission.

Distortion may also be added to a signal prior to transmission by any analog component that processes the signal. For example, a digital to analog converter can introduce errors and distortion.

A modulation error ratio (MER) is one metric used in the art to indicate a signal's fidelity. The frequency response distortions degrade the MER of the transmitted signal causing the receiver to receive a signal that may be difficult to interpret or demodulate properly.

The MER may be increased by manually adjusting components in the analog circuitry or by using more accurate analog components. Both approaches result in an increase in the expense of manufacturing the electronic device. There is a resulting need in the art to economically reduce frequency response distortions, thereby increasing MER, prior to transmission of a signal.

SUMMARY OF THE INVENTION

The embodiments of the present invention encompass a method for transmit pre-equalization of an information signal in a cable modem environment. Filter coefficients that have been stored in memory are read and loaded into a digital, predistortion filter. The information signal is filtered by the predistortion filter. The filter's characteristics are altered by the filter coefficients.

In one embodiment, the filter coefficients are generated by determining a difference between an ideal modulated information signal and a distorted modulated information signal that is transmitted from a cable modem termination system. The filter may be implemented as either a digital or an analog filter.

DETAILED DESCRIPTION OF THE PREFERRED EMBODIMENTS

The embodiments of the present invention provide a programmable, predistortion filter in a communication device that has modulation capabilities, such as a cable modem termination system (CMTS). Programmed filter coefficients alter the filter's characteristics to compensate for frequency response distortion, thereby increasing the MER of a transmitted signal in a communication system.

The subsequent discussion of the embodiments of the present invention refers to the predistortion filter as it relates to a cable modem system. Alternate embodiments use the predistortion filter and methods in other types of communication systems that implement some type of filtering operation to remove frequency response distortion.

Figure 1:
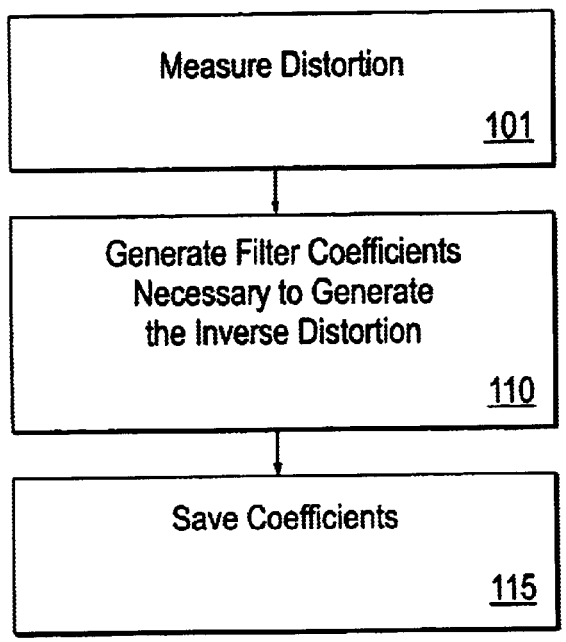
FIG. 1 shows a flowchart of one embodiment of a filter coefficient generation method of the present invention.

FIG. 1 illustrates a flowchart of one embodiment of a filter coefficient generation method of the present invention. The distortion generated by the analog circuitry of the CMTS is measured (101) by determining a difference between an ideal modulated information signal and a distorted modulated information signal that is transmitted.

In one embodiment, this is accomplished by causing the CMTS modulator to generate a data pattern with the desired modulation (e.g., QAM64 at 5.12 Msymbols/sec.). The transmit output from the CMTS is input to a vector signal analyzer with an activated equalizer. In this embodiment, the equalizer is configured to have a substantially similar number of taps and substantially similar sample rate as the predistortion filter. Once the equalizer is converged, the real and imaginary tap values are extracted from the vector signal analyzer and used as the predistortion filter coefficients (110) as described subsequently.

In an alternate embodiment, the filter coefficients are generated by measuring the frequency response of the system by forcing the modulator to generate a sweeping continuous wave (CW) signal throughout the channel passband. The frequency response is measured at the transmitter output using a spectrum analyzer or power meter.

The inverse of the frequency response is then computed as follows: if the measured frequency response is X(f), then the inverse is computed by subtracting X(f) from the average of X(f) over the channel passband. For example, if the passband is from 100–102 MHz, and if X(100 MHz) 2, X(101 MHz)=3, X(102 MHz)=4, then the inverse would be 3−X(f). Note that smaller frequency steps would normally be required for the desired accuracy. An inverse Fast Fourier Transform is then performed on the inverse frequency response vector to generate the predistortion filter coefficients (110).

The above-described methods for generating the predistortion filter coefficients are for illustration purposes only. The present invention is not limited to any one filter coefficient generation method.

The filter coefficients are stored in memory (115) for future use. In one embodiment, the coefficients are stored in non-volatile memory such as some type of programmable read only memory. However, the present invention is not limited to any one type of memory. The memory may be semiconductor, magnetic, or optical.

The method illustrated in FIG. 1, in one embodiment, is performed at approximately the same time that the electrical circuit is fabricated. For example, after fabrication of an analog circuit on a circuit board, the distortion caused by the circuit's components is measured and the required filter coefficients are stored in memory on the circuit board.

Each circuit board has a different set of components that generates a different level of distortion. The filter coefficients required to remove the distortion, therefore, are different for each set of components.

Figure 2:
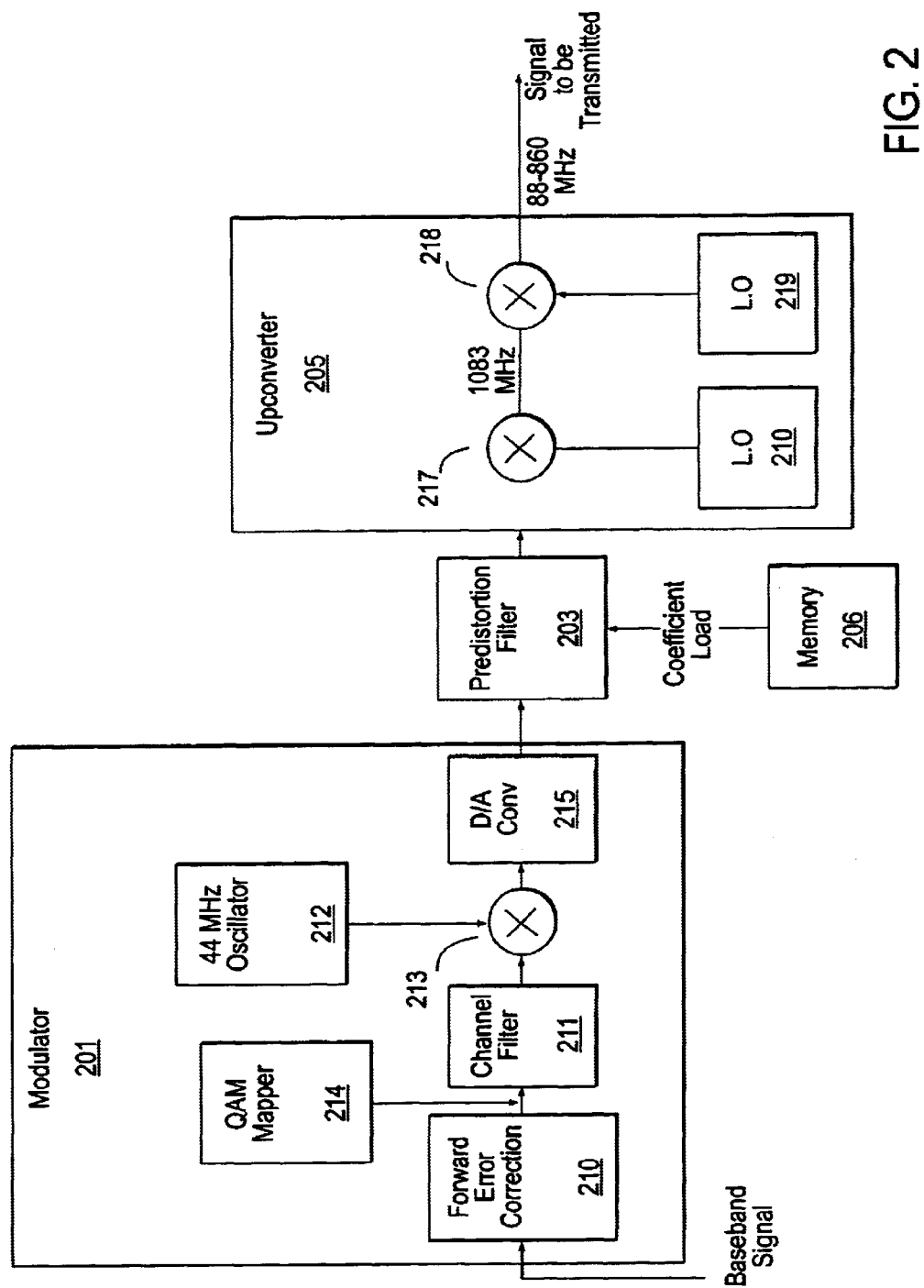
FIG. 2 shows a block diagram of one embodiment of a modulator and up-converter incorporating a predistortion filter of the present invention.

FIG. 2 illustrates a block diagram of one embodiment of a modulator and up-converter incorporating a predistortion filter (203) of the present invention. In one embodiment, a digital data stream signal at baseband frequency is input to the modulator (201). This digital signal can be generated by any digital circuitry and is not limited to the circuitry described herein.

In a CMTS embodiment, the modulator (201) performs the quadrature amplitude modulation (QAM) required to transmit a baseband signal from the CMTS to the cable modems on the subscriber end. The baseband data stream is input to forward error correction (210). The forward error correction (210) is a type of algorithm used in one-way data communications where additional data is added onto the digital signal to enable the receiving end to determine that no errors are received.

The signal from the forward error correction (210) goes through a QAM mapper (214). The QAM mapper (214) transforms the data stream into a digital representation of a QAM modulated signal. This occurs in both the real and imaginary domains.

The QAM mapped signal then goes through a channel filter (211). The channel filter (211) is responsible for shaping the spectrum of the signal to the desired shape, which minimizes adjacent channel power and optimizes the system error rate (by providing the signal shape for which the receiving device is optimized).

The intermediate frequency signal from the modulator (201) is then input to the digital predistortion filter (203) which adds distortion to exactly counter (or cancel out) the distortion added by all analog and digital signal processing between the QAM mapper and the RF output of the CMTS. The filter (203) is loaded with the filter coefficients that were generated in response to the distortion caused by the analog or digital circuitry.

In one embodiment, these coefficients are read from memory (206) where they were stored by the method of FIG. 1. The memory may be incorporated into the filter, part of the same circuit card as the modulator and upconverter, or it can be located in another part of the system and coupled to the predistortion filter through a data bus.

In this embodiment, the predistortion filter (203) is illustrated as being in the digital domain. However, alternate embodiments may implement the predistortion filter (203) as an analog filter.

The predistortion filter (203) of the present invention is not limited to any quantity of taps and/or sampling rate. These are determined by the distortion characteristics for which the filter is compensating and will be different for different situations.

The signal from the predistortion filter (203) is then mixed in an I/Q mixer (213) with a signal from an oscillator (212) in order to generate the intermediate frequency QAM signal. In the CMTS embodiment, the oscillator generates a 44 MHz signal. The present invention, however, is not limited to any one frequency.

A digital to analog converter (215) transforms the digital IF QAM signal to an analog information signal. This analog signal is then input to an upconverter (205). The upconverter (205) is responsible for generating a transmit frequency signal from the intermediate frequency signal while reducing the occurrence of spurious signals.

The upconverter (205) first mixes (217) a signal from a first local oscillator (216) to produce a high frequency signal. In a CMTS embodiment, this frequency is 1083 MHz. The high frequency signal is then mixed (218) with a signal from a second local oscillator (219) in order to generate the signal in the desired frequency band for transmission. Mixing the signal first to a higher frequency, and then down again keeps unwanted mixer products out of the desired transmit band. In the CMTS embodiment, this band is 88–860 MHz.

The frequencies illustrated in FIG. 2 are for purposes of illustration only. Other embodiments use different frequencies to accomplish substantially similar results. Additionally, alternate embodiments mix the filtered signal with only one local oscillator signal in order to upconvert the signal to the transmit band.

The use of the predistortion filter as shown in the CMTS embodiment of FIG. 2 is for illustration purposes only. The predistortion filter is not limited to only a CMTS embodiment but may be incorporated in any electronic circuit that requires removal of distortion using predetermined filter coefficients.

Figure 3:
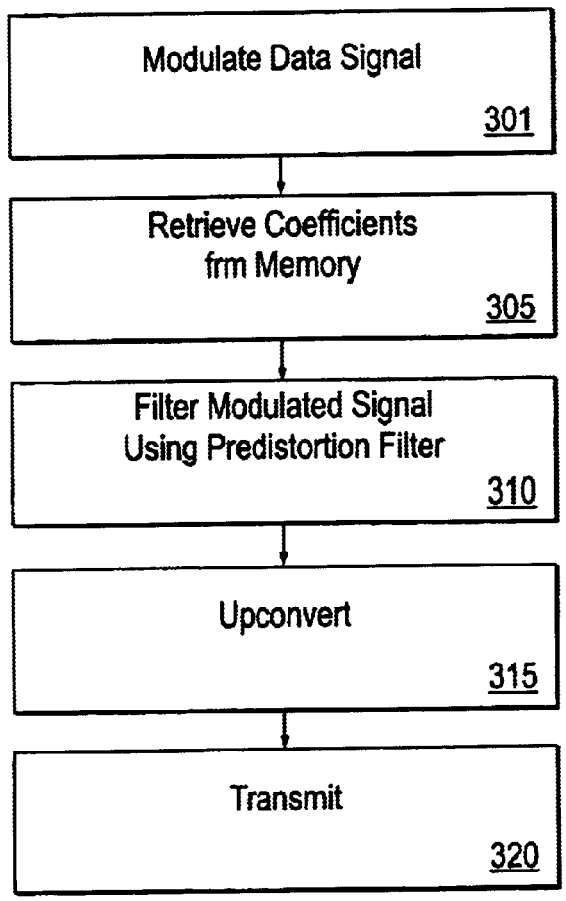
FIG. 3 shows a flowchart of one embodiment of a transmit pre-equalization method of the present invention.

FIG. 3 illustrates a flowchart of one embodiment of a transmit pre-equalization method in accordance with the embodiment of FIG. 2. A baseband data stream is modulated (301) in order to generate a QAM data signal.

The previously stored filter coefficients are read from memory and loaded into the predistortion filter (305). The QAM signal is then filtered with the predistortion filter using the filter coefficients (310).

The filtered signal is upconverted from an intermediate frequency to a transmit frequency (315). The upconverted signal can then be transmitted (320).

Figure 4:
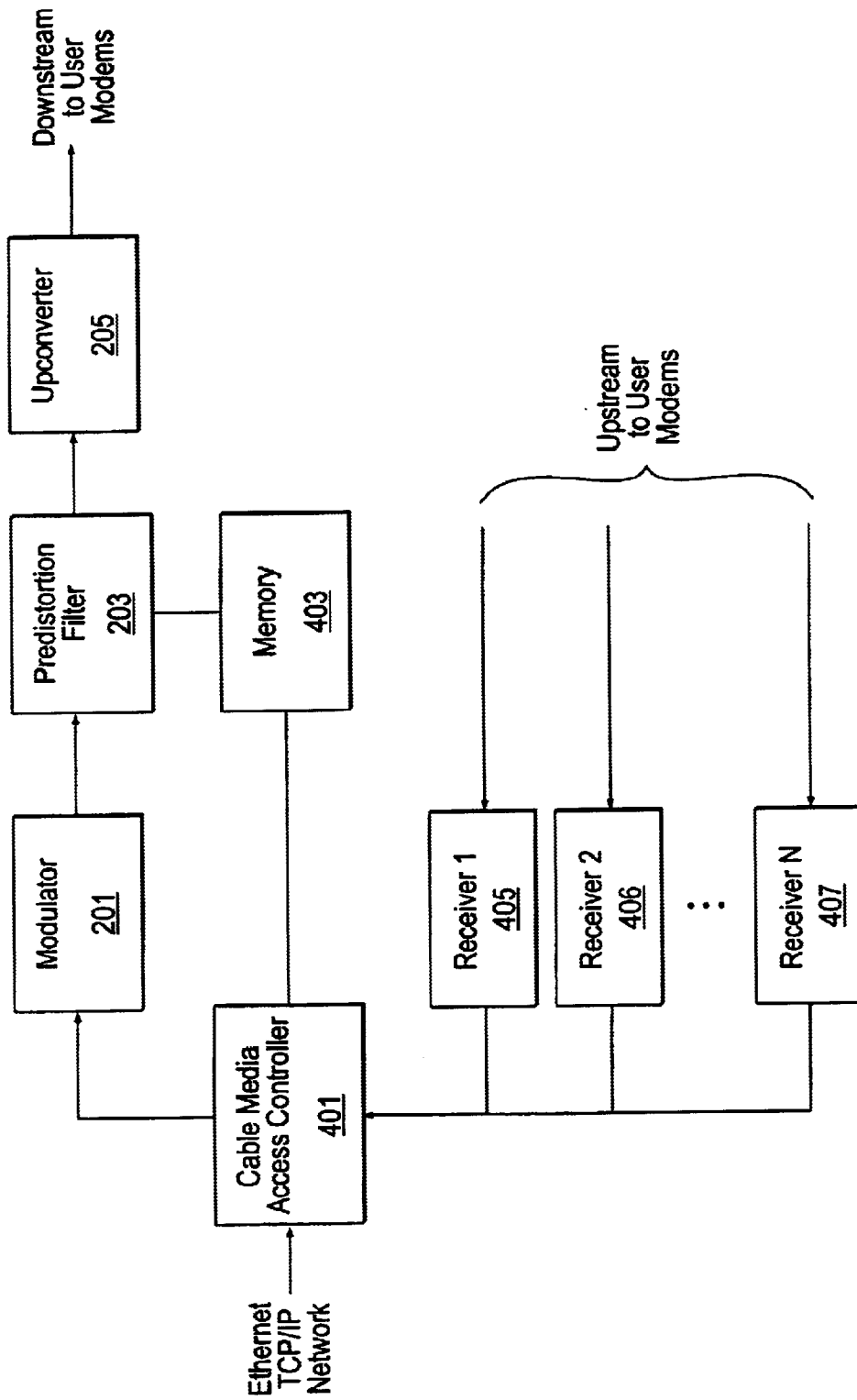
FIG. 4 shows a block diagram of one embodiment of a cable modem termination system in accordance with the present invention.

FIG. 4 illustrates one embodiment of a CMTS incorporating a predistortion filter of the present invention. The CMTS receives data traffic coming from a group of subscribers and routes it to an Internet Service Provider for connection to the Internet. The CMTS also routes data from the Internet to the appropriate subscriber.

The CMTS, in this embodiment, is coupled to an Ethernet network that transmits data using Transmission Control Protocol/Internet Protocol (TCP/IP). The TCP/IP data is coupled to a cable media access controller (401). The media access controller (401) acts as an interface between the hardware and software portions of various network protocols. In one embodiment, the media access controller (401) translates the TCP/IP into whatever protocol is being used on the downstream (i.e., to the subscriber's modem) side of the system.

In another embodiment, the media access controller is responsible for loading the filter coefficients that are stored in memory (403) into the predistortion filter (203). The embodiment of FIG. 4 shows the memory (403) as being a separate block. One embodiment incorporates the memory into the media access controller (401). Another embodiment incorporates the memory into the predistortion filter (403).

In the embodiment of FIG. 4, the predistortion filter (203) is illustrated as being located after the modulator (201). This location is outside the digital to analog converter in the modulator (201). Therefore, the predistortion filter (203) is filtering an analog signal as opposed to the digital signal of the embodiment of FIG. 2. The location of the predistortion filter (203) is not critical.

One embodiment uses a dedicated controller (e.g., POWERPC) to perform the media access controller (401) function. If the CMTS is part of a larger system (e.g., computer system), the media access controller's functions may be offloaded or shared by the system's controller.

The baseband data signal from the media access controller (401) is input to the modulator (201). The QAM signal from the modulator (201) is input to the predistortion filter (203) to add pre-distortion. The filtered signal is then upconverted (205) to the transmit frequency. In one embodiment, the signal at the transmit frequency is coupled to the subscriber modems over cable.

An upstream side of the system comes from the subscriber's cable modems to the CMTS. The CMTS may have multiple receivers (405–407) that demodulate the signals from the upstream connection. Each receiver may be assigned to one subscriber modem or one receiver may be assigned to groups of subscriber modems. The demodulated signals from the receivers are input to the cable media access controller (401) for conversion to the network protocol.

Numerous modifications and variations of the present invention are possible in light of the above teachings. It is therefore to be understood that within the scope of the appended claims, the invention may be practiced otherwise than as specifically described herein.

What is claimed is:

1. A method for removing distortion in an information signal generated in a cable modem termination system comprising an electrical circuit including a memory module, the method comprising:
retrieving filter coefficients from memory module, wherein the filter coefficients are generated and stored in the memory module when the electrical circuit of the cable modem termination system is fabricated and wherein the filter coefficients do not change over time;
loading a predistortion filter with the filter coefficients; and
filtering the information signal with the predistortion filter in response to the filter coefficients.

2. The method of claim 1 and further including modulating the information signal prior to filtering.

3. The method of claim 2 wherein the modulating comprises quadrature amplitude modulating.

4. The method of claim 2 and further including upconverting the filtered information signal prior to transmission over a cable network.

5. The method of claim 1 wherein the information signal is a baseband data stream originating from a Transmission Control Protocol/Internet Protocol compliant network.

6. The method of claim 1 wherein the filter coefficients are generated from an error between an ideal modulated information signal and a distorted modulated information signal.

7. The method of claim 6 and further including:
generating filter coefficients in response to the error; and
saving the filter coefficients.

8. The method of claim 6 and further including:
generating a modulated data pattern with a modulation method in the cable modem termination system;
causing an activated equalizer to converge in response to the modulated data pattern, the activated equalizer having a substantially similar quantity of taps and substantially similar sample rate as the predistortion filter;
extracting real and imaginary tap values from the activated equalizer after convergence; and
storing the real and imaginary tap values for use as the filter coefficients.

9. The method of claim 6 and further including:
generating a continuous wave signal through a cable modem termination system modulator;
measuring a frequency response of the cable modem termination system;
determining an inverse frequency response in response to the measured frequency response; and
generating the filter coefficients in response to an inverse Fast Fourier Transform on the inverse frequency response.

10. A method for transmit pre-equalization of a modulated information signal with a predistortion filter, the method comprising:
reading filter coefficients from memory, wherein the static filter coefficients are generated and stored in memory when an electrical circuit of the predistortion filter is fabricated;
loading the digital filter with the filter coefficients; and
filtering the modulated information signal with the predistortion filter by modifying the predistortion filter's characteristics in response to the static filter coefficients.

11. The method of claim 10 wherein the modulated signal is a quadrature amplitude modulated signal.

12. The method of claim 10 and further including:
measuring distortion in the modulated information signal without filtering;
generating the filter coefficients in response to the measured distortion; and
saving the filter coefficients in memory.

13. A method for transmit pre-equalization of an information signal with a digital filter in a cable modem termination system, the method comprising:
modulating the information signal with a quadrature amplitude modulation (QAM) technique such that a QAM signal is generated;
channel filtering the QAM signal;
reading filter coefficients from memory, wherein the static filter coefficients are generated and stored in memory when an electrical circuit of the cable modem termination system is fabricated;
loading the digital filter with the filter coefficients;
filtering the QAM signal with the digital filter by altering the digital filter's characteristics in response to the static filter coefficients to generate a filtered signal;
converting the filtered signal from a digital signal to an analog information signal; and
upconverting the analog information signal to a transmit frequency.

14. The method of claim 13 wherein upconverting comprises:
mixing the filtered signal with a first local oscillator signal to generate a first mixed signal; and
mixing the first mixed signal with a second local oscillator signal to generate the information signal at the transmit frequency.

15. The method of claim 14 wherein the transmit frequency falls in a frequency band of 88 MHz to 860 MHz.

16. A method for transmit pre-equalization of a modulated information signal in a cable modem termination system having a predistortion filter, the method comprising:
measuring a distortion level of the modulated information signal;
generating predistortion filter coefficients in response to the measured distortion level; and
saving the predistortion filter coefficients in memory when an electrical circuit of the cable modem termination system is fabricated,
wherein the predistortion filter coefficients do not change over time.

17. The method of claim 16 and further including:

reading the predistortion filter coefficients from memory;

loading the predistortion filter with the predistortion filter coefficients; and filtering the modulated information signal with the predistortion filter by altering the predistortion filter's characteristics in response to the predistortion filter coefficients.

18. A cable modem termination system comprising:

a modulator for generating a modulated information signal from a baseband signal;

a predistortion filter coupled to the modulator, the predistortion filter generating a filtered signal in response to programmable filter coefficients that have been generated and stored in memory in response to a measured distortion of a signal transmitted from the cable modem termination system when an electrical circuit of the cable modem termination system is fabricated, wherein the programmable filter coefficients do not change over time; and an upconverter, coupled to the predistortion filter, for mixing the filtered signal to a frequency in a transmit frequency band.

19. The cable modem termination system of claim 18 and further including a cable media access controller, coupled to the modulator, that provides the baseband signal.

20. A cable modem termination system comprising:

a cable media access controller capable of providing a baseband data stream signal from a network data signal having a first network protocol;

a quadrature amplitude modulation mapper, coupled to the cable media access controller, for generating a modulated signal from the baseband data stream signal;

a channel filter that generates a filtered signal from the modulated signal;

memory that stores programmable filter coefficients that have been generated in response to a measured distortion of a signal transmitted from the cable modem termination system when an electrical circuit of the cable modem termination is fabricated, wherein the programmable filter coefficients do not change over time;

a digital predistortion filter coupled to the channel filter, the digital predistortion filter generating a predistortion filtered signal in response to the programmable filter coefficients;

an intermediate frequency converter that generates a digital intermediate frequency signal from the predistortion filtered signal;

a digital to analog converter that generates an analog intermediate frequency signal from the digital intermediate frequency signal; and an upconverter that converts the analog intermediate frequency signal to a signal having a frequency in a transmit frequency band.

21. The cable modem termination system of claim 20 and further including forward error correction.

22. A method for transmit pre-equalization of an information signal with a predistortion filter in a cable modem termination system, the method comprising:

modulating the information signal with a quadrature amplitude modulation (QAM) technique such that a QAM signal is generated;

channel filtering the QAM signal to produce a filtered signal;

convening the filtered signal from a digital signal to an analog intermediate frequency signal;

reading static filter coefficients from memory, wherein the static filter coefficients are generated and stored in memory when an electrical circuit of the cable modem termination system is fabricated;

loading the predistortion filter with the static filter coefficients;

filtering the filtered signal with the predistortion filter by altering the predistortion filter's characteristics in response to the static filter coefficients to generate an analog information signal; and upconverting the analog information signal to a transmit frequency.

* * * * *